Patented Jan. 30, 1945

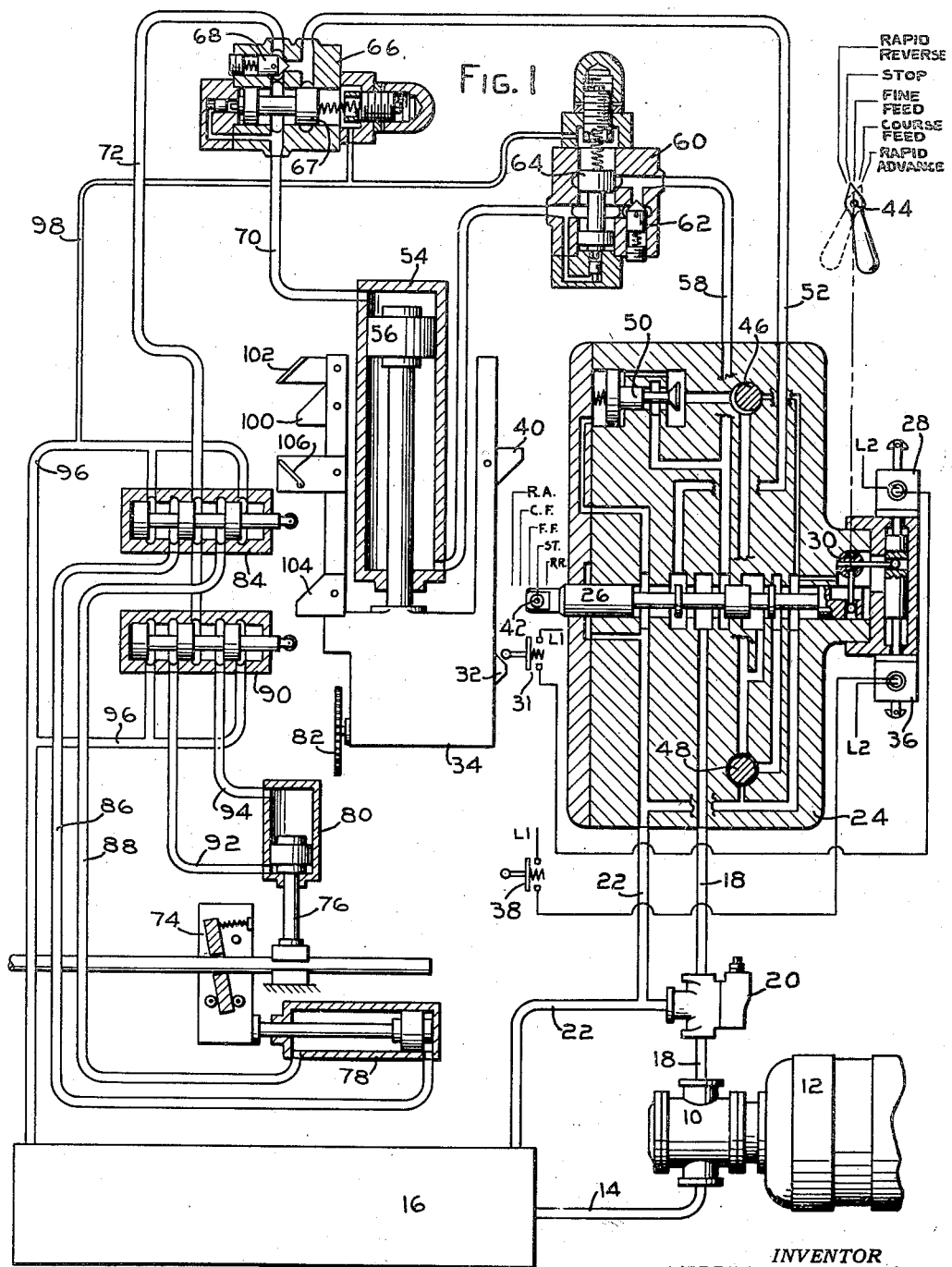

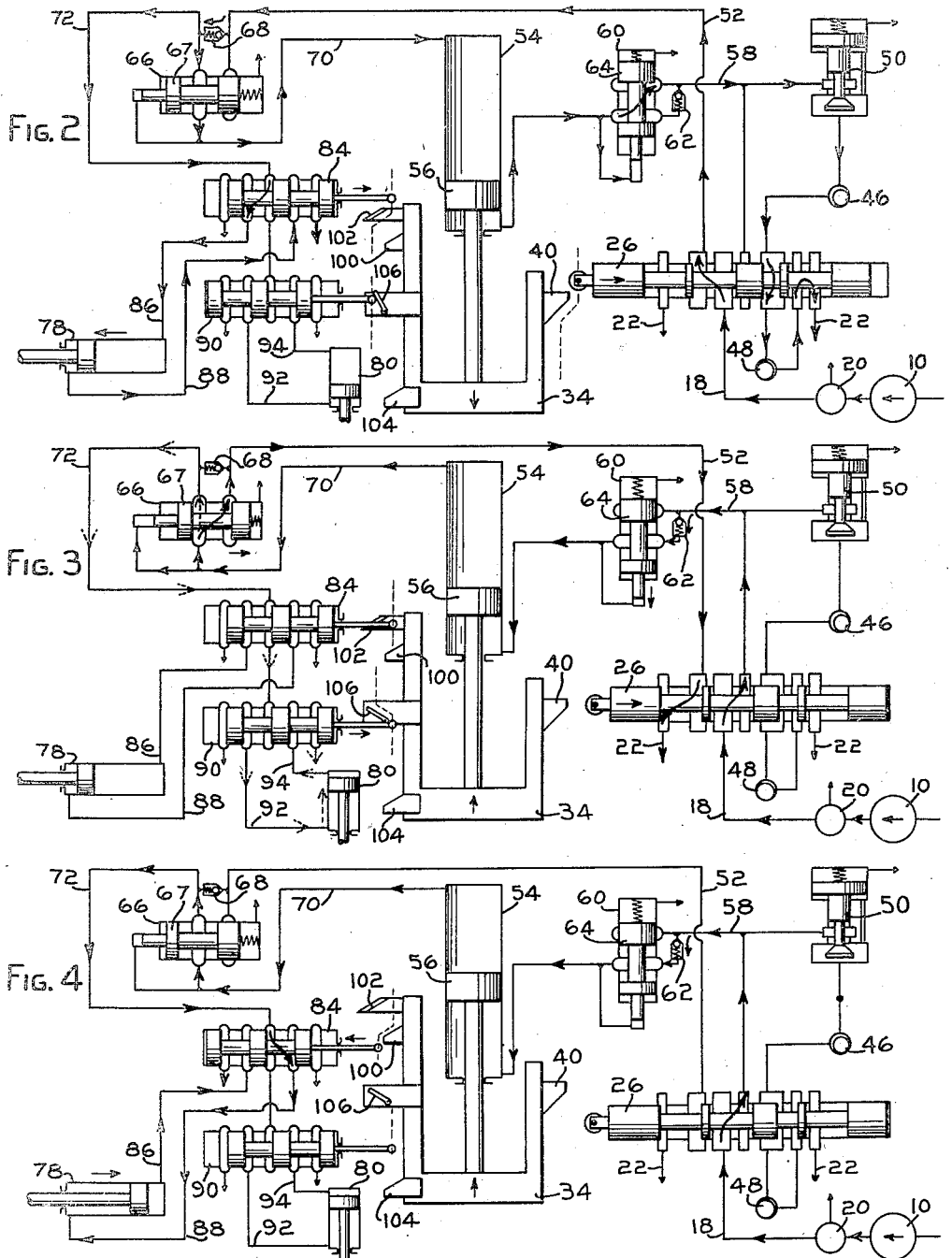

2,368,138

UNITED STATES PATENT OFFICE 2,368,138

POWER TRANSMISSION

Merrill A. Hayden, Detroit, Mich., assignor to Vickers Incorporated, Detroit, Mich., a corporation of Michigan Application February 24, 1941, Serial No. 380,293

1 Claim. (Cl. 60—52)

This invention relates to power transmissions, particularly to those of the type comprising two or more fluid pressure energy translating devices, one of which may function as a pump and another as a fluid motor.

The invention is more particularly concerned with a power transmission system for operating a machine tool. It is common in many machine tools, such as drill presses, milling machines, boring machines, etc., to operate a main slide of the machine by means of a hydraulic power transmission system provided with automatic control for producing a cycle of slide movement including a rapid advance, a feed advance and a rapid return. The hydraulic equipment for operating machines of this character has become fairly standardized and readily available from various manufacturers. One such standardized system utilizes a fixed displacement pump and relief valve together with a control panel incorporating all of the necessary control valves for regulating the fluid flow to produce the desired cycle of the machine tool slide.

It is occasionally desirable to build into a given machine certain auxiliary apparatus such as work clamps, stock feeders, work ejectors, etc., and to operate them hydraulically. This has heretofore required the provision of a separate pressure source for supplying operating fluid to the auxiliary equipment or else a special hydraulic control system is necessary for the complete machine.

With a standard transmission system of the type mentioned above wherein a fixed displacement pump and relief valve form the pressure source, the full rated capacity of the pressure source is not utilized at all times. Thus, during rapid advance and rapid return movement the full volumetric capacity of the pump is utilized but at a lower pressure than the pump is rated for. Likewise, during feed movement, substantially the full rated pressure of the pump is utilized, but a small portion of its volumetric capacity is required for operating the slide at the slower feed rate.

It is an object of the present invention to provide an improved power transmission system wherein auxiliary slides may be operated from the conventional standard system for operating one slide and wherein a single source of pressure is all that is required.

It is a further object to provide a transmission system of this character in which the auxiliary motors may be actuated at any time during the cycle of the main slide without in any way interfering with the operation of the main slide, and futhermore to accomplish this by using the excess capacity of the single source, whether it be excess pressure capacity or excess volume capacity at a given time during the main slide cycle.

Further objects and advantages of the present invention will be apparent from the following description, reference being had to the accompanying drawings wherein a preferred form of the present invention is clearly shown.

In the drawings:

Figure 1 is a diagrammatic view of a power transmission system incorporating a preferred form of the present invention.

Figures 2, 3 and 4 are schematic views of the power transmission circuit of Figure 1 showing the parts in different positions.

Referring now to Figure 1, a fixed displacement pump 10 is adapted to be driven by an electric motor 12 and has a suction conduit 14 connected with a tank 16. The delivery conduit 18 of the pump has the usual pressure responsive relief valve 20 therein for bypassing oil to tank through a conduit 22 whenever a predetermined pressure is exceeded in the conduit 18.

The conduit 18 extends to the pressure port of a control panel 24, the tank connection of which communicates with the conduit 22. The panel 24 may be of well-known standard construction such, for example, as that illustrated in the application of Kenneth R. Herman et al., Serial No. 155,652, filed July 26, 1937, for a Hydraulic feed control panel, since issued as Patent No. 2,274,603.

Briefly, such a panel comprises a main control stem 26 having a plurality of lands thereon for controlling communication between the various passages within the panel to provide five different flow conditions, namely, a rapid advance, a coarse feed, a fine feed, a stop and a rapid reverse, as the stem is moved from left to right between the various positions illustrated.

The stem may be moved from the stop to the rapid advance position by a solenoid 28 acting through a bell crank 30 to shift the stem to the left whenever the solenoid is energized. For this purpose a contactor 31 may be actuated by a cam 32 carried by the main slide 34 of the machine to be actuated, the arrangement being such that the switch 31 is closed and the solenoid 28 is energized when the slide 34 reaches the end of its return stroke to thus automatically restart the machine on a rapid advance stroke. Similarly, a solenoid 36 may act through the bell crank 30 to shift the stem 26 completely to the right to the rapid reverse position whenever the cam 32 actuates a contactor 38 which occurs at the end of the advance stroke of the slide. At an intermediate point in its advancing stroke a cam 40 may contact a roller 42 mechanically shifting the stem to the right from rapid advance to either one of the feed positions. A control handle 44, indicated diagrammatically, may be used to manually shift the stem 26 to any position.

The panel also may include a pair of manually adjustable throttles 46 and 48, one of which controls the fine feed and the other of which controls the coarse feed. A hydrostatic flow control valve 50 is arranged in series with the throttles to maintain a predetermined pressure drop across them irrespective of variations in work resistance.

The entire arrangement is such that, in the rapid advance position of stem 26, the delivery conduit 18 is connected directly with a conduit 52 communicating with the upper end of a cylinder 54, the piston 56 of which is connected to actuate the slide 34. In this position of the stem, the tank conduit 22 is also directly connected with a conduit 58 leading to the lower end of cylinder 54.

When the stem is shifted to coarse feed position, the pump delivery remains connected to conduit 52 while the conduit 58 is cut off from direct connection with conduit 22, and a connection leading through the hydrostatic valve 50 and the first throttle 46 is established between conduits 58 and 22.

In the next position of the stem for producing fine feed, this path is made to include the throttle 48 in addition to the throttle 46, while in the stop position the pressure and tank conduits 18 and 22 are connected together to bypass the pump delivery. With the stem 26 shifted to rapid return position, conduit 18 is directly connected with conduit 58, and conduit 52 is directly connected with conduit 22.

The conduit 58 may include a foot valve 60 of conventional construction such as illustrated in the Herman Patent No. 2,200,824, including a self-contained check valve 62 for free flow from the panel to the cylinder and a pressure-responsive, back-pressure valve 64 arranged to prevent back-flow from the cylinder 54 except at a pressure above that produced by the gravity load on piston 56.

The conduit 52 connects with the pressure-responsive discharge port of a second back-pressure valve 66 similar to the valve 64, the check valve 68 of which permits free flow from conduit 52 into the head end of motor 54. The pressure responsive valve 67 prevents return flow except at a predetermined pressure in conduit 70 between valve 66 and cylinder 54.

Permanently connected to the conduit 70 is a branch conduit 72 which forms the supply connection at all times for the auxiliary motors which it is desired to operate from the pump 10 without interfering with the normal cycle of cylinder 54. As an example of a typical use which may be made of this auxiliary supply connection 72, there is shown diagrammatically a stock feeding and stock clamping mechanism 74 and 76, respectively, each actuated by a cylinder-and-piston hydraulic motor 78 and 80. Such a mechanism may be found useful in connection with a hydraulically-actuated bar cut-off saw, the main slide 34 carrying a saw indicated diagrammatically at 82.

The motor 78 is controlled by a conventional four-way reverse valve 84 through conduits 86 and 88 leading to opposite ends of the motor 78. Likewise a similar valve 90 controls the motor 80 through conduits 92 and 94. The valves 84 and 90 are supplied with pressure fluid through the conduit 72 which extends through valve 84 to the valve 90 as well. A tank conduit 96 connects the various tank ports of the valves 84 and 90 with the tank 16 and includes a branch 98 serving as a seepage drain for the valves 60 and 66.

The valve 84 is adapted to be actuated to the left by a cam 100 and to the right by a hook cam 102, both cams being carried by the slide 34. Similarly, the valve 90 may be actuated to the left by a cam 104 and to the right by a flipper cam 106 which actuates the valve 90 only on upward movement of the slide and not on downward movement thereof.

In operation, with the parts in the position shown in Figure 1, the slide is at rest, and fluid delivered by the pump 10 is bypassed from conduit 18 to conduit 22 and tank 16 through the central valve of the panel 24. The foot valve 60 sustains the gravity load of slide 34 and prevents oil from being discharged from the lower end of cylinder 54.

When it is desired to start the machine in continuous operation, the handle 44 may be shifted to the rapid advance position, thus directing the pump delivery through conduit 18 to conduit 52 where it flows freely through check valve 68 and conduit 70 to the upper end of cylinder 54. Pressure builds up therein sufficiently to force the slide 34 downwardly against the back pressure maintained by valve 64, and, since the throttles 46 and 48 and hydrostatic valve 50 are bypassed, the slide moves at a rapid advance rate.

At this time pressure is also delivered through branch conduit 72, valve 84 and conduit 88 to the left end of motor 78, maintaining the stock feeder in its advanced position, and through valve 90 and conduit 94 to the upper end of motor 80, maintaining the clamp 76 engaged with the stock.

When the slide 34 has been extended to the point where cam 40 contacts roller 42, the stem 26 is shifted two steps to the right to the fine feed position, as illustrated in Figure 2, thus closing the bypass around both throttles and the hydrostatic valve and forcing all the oil returning from the lower end of cylinder 54 to pass therethrough. The pressure in delivery conduit 18 immediately builds up to the setting of relief valve 20, and the excess volumetric capacity of the pump 10 over and above the quantity which is permitted to flow through the throttles 46 and 48 is bypassed to tank through conduit 22.

Shortly after the stem 26 is shifted, the cam 102 shifts valve 84, as is shown in Figure 2, permitting part of the excess volumetric capacity of the pump to flow through check valve 68, conduit 72, valve 84 and conduit 86 to the right end of motor 78, thus retracting the stock feeder 74. As soon as it has completed its movement, this flow stops, and therafter all of the excess pump capacity flows over the relief valve 20 to conduit 22.

As the slide 34 continues downwardly at a feed rate, the saw 82 cuts through the stock, and, when this has been completed, the cam 32 closes the contactor 38 energizing solenoid 36. The stem 26 is accordingly shifted completely to the right to the rapid return position, as illustrated in Figure 3. The pump delivery is now directed from conduit 18 to conduit 58 where it flows freely through check valve 62 to the lower end of cylinder 54. Oil discharging from the upper end of the cylinder cannot escape until a predetermined pressure is built up sufficient to open the valve 66, thus permitting return through conduit 52, panel 24, and conduit 22 to tank. The pressure setting of valve 66 is slightly higher than the pressure required to operate motors 78 and 80.

As soon as the slide 34 has returned sufficiently so that the saw 82 has cleared the work or, in other words, to about the position where cam 40 is opposite roller 42, cam 106, which passed idly by the valve 90 on its down stroke, passes the same on its upward stroke shifting it to the right and directing pressure oil from conduit 72 to conduit 92 and the lower end of cylinder 80, thus releasing the clamp 76. This action is indicated in Figure 3, and it will be noted that cylinders 54 and 80 are connected in series at this time. In other words, as soon as valve 90 is shifted, the motor 80 offers less resistance to the flow of oil out of conduit 70 than does the back pressure valve 66 so that the latter closes, and all of the oil returning from motor 54 passes through conduit 72 and valve 90 to the motor 80 as is indicated by the dotted arrows. As soon as this motor has been shifted completely, pressure will again build up to open valve 66 after which the flow out of conduit 70 is as indicated by solid arrows.

As the slide 34 continues on its upward stroke, cam 100 shifts valve 84 to the left, as indicated in Figure 4, thus directing pressure oil from conduit 72 through conduit 88 to the left end of motor 78. The stock feeder is accordingly shifted to the right carrying the stock with it, the motor 78 being in series with motor 54 during this action. Just before the slide 34 returns to its starting position, cam 104 shifts valve 90 back to the left, again moving clamp 76 downwardly, and, when cam 32 closes contactor 31, solenoid 28 is energized, restarting the slide 34 on a rapid advance stroke. This cycle may be repeated indefinitely until the device is stopped by shifting handle 44 to the stop position.

It will be noted that the auxiliary motors are actuated by the single pump without in any way interfering with or slowing down the cycle of the main motor. This permits the use of a standard panel and pressure source and, at the same time, provides a supply of fluid to operate the auxiliaries by making use of the normally unused excess capacity of the source both during a forward feeding movement when an excess of volume is available and during a rapid return movement when an excess of pressure is available. Furthermore the time cycle of the auxiliary motors is not limited to a particular portion of the main motor time cycle but may be made to extend into both forward feeding time and the rapid return time.

While the form of embodiment of the invention as herein disclosed constitutes a preferred form, it is to be understood that other forms might be adopted, all coming within the scope of the claim which follows.

What is claimed is as follows:

In a hydraulic power transmission system having a single source of fluid under pressure, a main fluid motor and flow controlling means intermediate the source and motor for causing operation of the motor in either direction at a speed utilizing the full delivery rate of said source and at a substantially slower speed in at least one direction, the combination of an auxiliary motor operable from said source, a conduit permanently connecting with one side of the main motor and forming a supply connection to the auxiliary motor, a valve mechanism providing free flow from the source into said one side of the motor and blocking return flow therefrom, and means for operating the valve mechanism to permit return flow in response to pressure in said supply connection above that necessary to operate the auxiliary motor.

MERRILL A. HAYDEN.